2,802,344
Patented Aug. 13, 1957

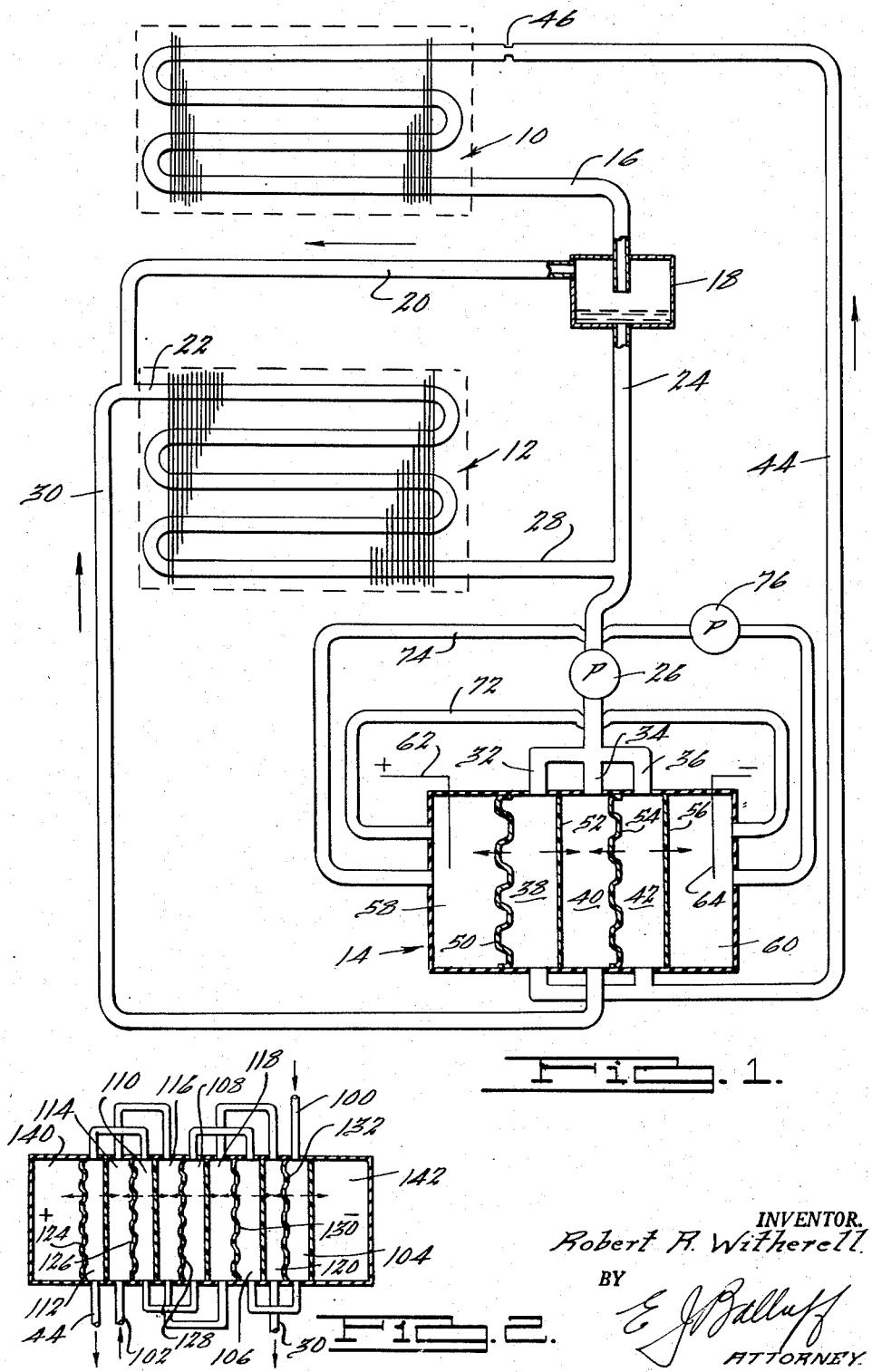

2,802,344

ELECTRODIALYSIS OF SOLUTIONS IN ABSORPTION REFRIGERATION

Robert R. Witherell, Bloomington, Ill., assignor, by mesne assignments, to Eureka Williams Corporation, a corporation of New York Application July 8, 1953, Serial No. 366,701

14 Claims. (Cl. 62—119)

This invention relates to absorption refrigeration and has particular reference to such a system wherein the refrigerant and the absorbent mixture constitutes an electrolyte which is separated by dialysis into a refrigerant component and an absorbent component.

Absorption refrigeration is quite inefficient because of the high heat input required relative to the amount of refrigeration obtained with the result that it has to a large extent and for many applications been displaced or superseded by compression types of systems. Compression systems, while commonly used, are not too satisfactory for many applications because of the bulk of the apparatus, the problem of obtaining a satisfactory source of power therefor on an economical and efficient basis and because in many instances satisfactory performance cannot be obtained without employing a water cooled condenser, and, in addition, the lack of condenser cooling water in many instances precludes or limits the use of such systems.

This invention contemplates an absorption system in which the absorbent and refrigerant mixture constitutes an electrolyte which is separated by electro-dialysis. This electro-dialysis absorption system is free of many of the problems and limitations inherent in presently known absorption and compression systems.

A principal object of the invention is to provide a new system and method of refrigeration.

Another object of the invention is to provide a system and method of absorption refrigeration.

Other objects and advantages of the invention will be apparent from the following specifications taken in conjunction with the accompanying drawings, of which there are two sheets, and wherein:

Fig. 1 is a schematic diagram of a refrigeration system embodying my invention;

Fig. 2 is a schematic diagram illustrating a modified form of electro-dialyzer.

Figure 3:
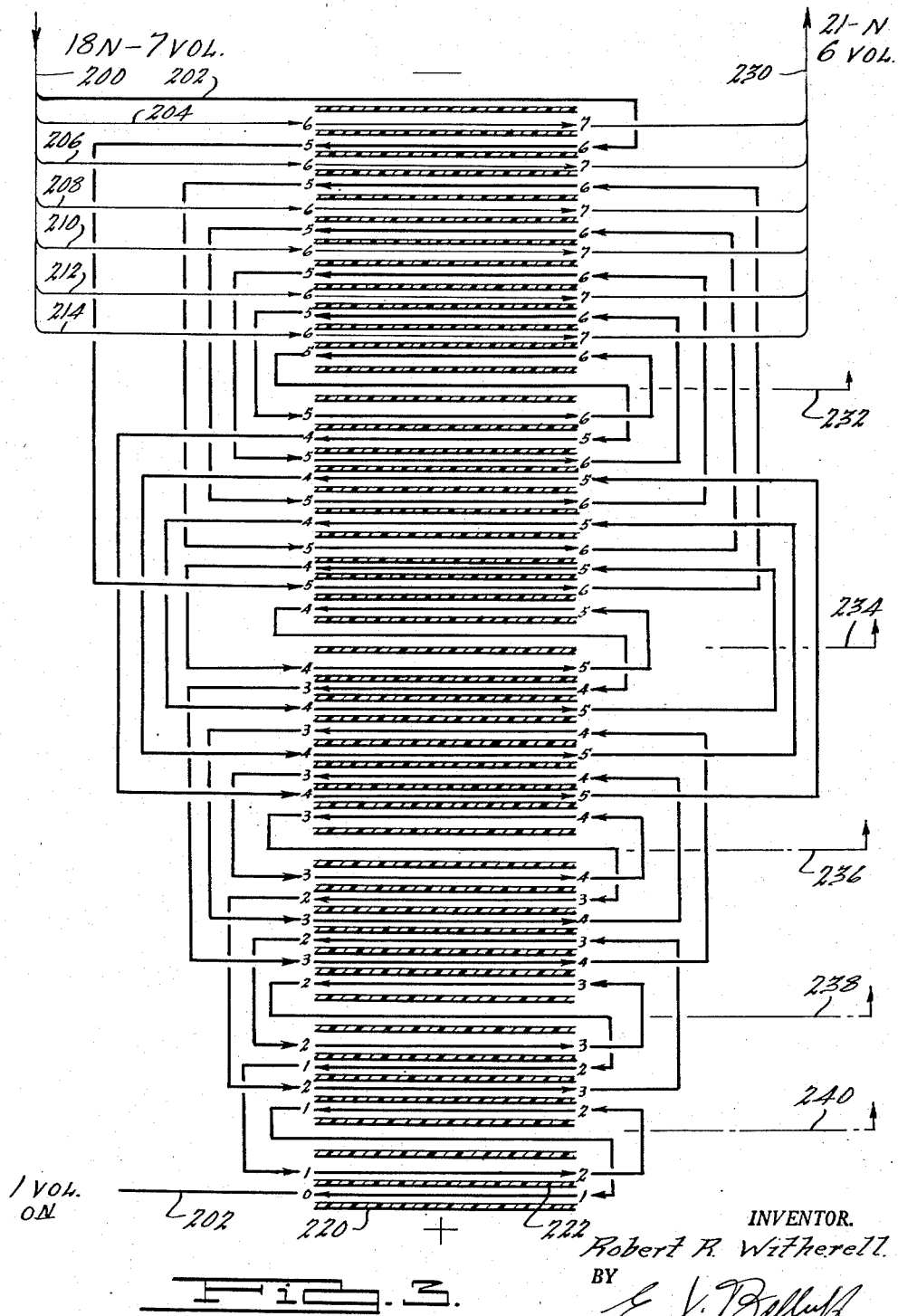
Fig. 3 is a schematic view illustrating a further modified form of electro-dialyzer.

As illustrated in Fig. 1, a refrigeration system embodying my invention comprises in general an evaporator 10, an absorber 12, an electro-dialyzer 14 and a working fluid which comprises an electrolyte solution which in passage through the dialyzer separates into a liquid refrigerant and an absorbent. In the dialyzer, positive and negative ions of the electrolyte are caused to migrate by electro-dialysis through ion permeable membranes to form a concentrated solution (which constitutes the absorbent) and a dilute solution (which constitutes the refrigerant), the partial vapor pressure of such concentrated solution at the temperatures at which heat rejection occurs in the absorber being less than the partial vapor pressure of the dilute solution at the temperatures at which heat absorption occurs in the evaporator 10.

Expanded refrigerant vapor and liquid residues (if any) from the evaporator 10 are returned by conduit 16 to the separator 18. From the separator 18, such vapor is conducted by conduit 20 to the intake end 22 of the absorber, while conduit 24 returns the liquid residue from the separator 18 to the intake of circulating pump 26. Conduit 28 connected to the discharge of the absorber 12 is also connected to the intake of the circulating pump 26. In the absorber such refrigerant vapor is absorbed by the absorbent liquid which is supplied to the absorber through the conduit 30. The conduit 28 conducts the refrigerant and absorbent mixture to the pump 26.

The pump 26 effects the circulation of such absorbent and refrigerant mixture through the conduits 32, 34 and 36 into the cells 38, 40 and 42 of the electro-dialyzer 14. By electro-dialysis the concentration of the liquid as it flows through the cells 38 and 42 is reduced and the dilute solution discharged from the cells 38 and 42 constitutes the refrigerant and is supplied through conduit 44 to the evaporator 10 under the control of a suitable pressure reducing device, such as the metering orifice 46. The concentration of the liquid flowing through the cell 40 of the dialyzer is increased by dialysis and the concentrated solution discharged from the cell 40 is supplied through the conduit 30 to the absorber 12. The pump 26 may be employed if necessary to effect the circulation of liquid between the absorber 12 and the dialyzer 14 and also the circulation of liquid refrigerant from the dialyzer 14 to the evaporator 10.

Since the partial vapor pressure of the absorbent liquid is less at the temperature at which heat is dissipated from the absorber than the partial vapor pressure of the dilute solution of the refrigerant at the temperature at which evaporation takes place in the evaporator, refrigerant vapor will flow from the evaporator into the absorber 12 for absorption into the absorbent liquid. The vapor pressure of the absorbent and the refrigerant liquid will depend on the working fluids employed and the concentrations thereof supplied to the absorber and the evaporator, respectively, and the temperature levels at which the absorber and the evaporator operate will also depend on the working fluids employed, and the concentrations supplied to the evaporator and the absorber.

By selecting working fluids having the required vapor pressure characteristics at the desired temperature levels of operation of the evaporator and the absorber, refrigeration may be produced at various temperatures throughout a wide range suitable for freezing, refrigerating or air-conditioning applications.

Commonly recognized classes of electrolytes are acids, bases and salts. Examples of acids that may be employed in this type of system are sulphuric acid, phosphoric acid, nitric acid and perchloric acid. Examples of bases that may be employed in this type of system are potassium hydroxide and sodium hydroxide. Examples of salts that may be employed in this type of system are halides of the alkali metals and the alkaline earth metals, such as lithium bromide, lithium iodide and calcium chloride, tetraalkylammonium salts, and perchlorates of the alkali metals and the alkaline earth metals. Solvents may be aqueous and/or non-aqueous. Examples of non-aqueous solvents of sufficient volatility to act as dissociating solvents for electrolytes are alcohols such as methanol, ethanol, propanol and isopropanol, and nitriles, such as acetonitrile, propionitrile, malonic nitrile and ethylene cyanide.

The choice of a solvent and electrolyte is governed, among other things, by the solubility, the degree of dissociation, the conductivity of the electrolyte in a particular solvent and also the desired vapor pressures within the desired temperature range as previously indicated. In addition, the nature of the reactions at the electrodes should be considered. Preferably, the solute should have a negligible vapor pressure when dissolved in a particular solvent.

Other factors to be taken into consideration in the selection of a solvent are its boiling and freezing points, the boiling point elevation constant for the solutions employed, the latent heat of vaporization thereof, the dielectric constant, the swelling effect of the membranes produced by the electrolyte, the viscosity of the solvent and ionic mobility in the solvent. One or more liquids might be employed as the solvent and in addition the electrolyte might comprise one or more materials.

Preferably not all of the dilute solution is evaporated in the evaporator, thus leaving a concentrated liquid residue. This concentrated residue may be passed to the absorber, though it seems preferable to pass it as illustrated directly to the dialyzer and this is effected by means of separator 18 and the conduit 24. The electro-dialyzer 14, as illustrated in Fig. 1, is separated by the ion permeable membranes 50, 52, 54 and 56 into cells 38, 40, 42, an anode compartment 58 and a cathode compartment 60. Each of such membranes is constructed so as to prevent any appreciable flow of liquid therethrough. The anode compartment 58 has an anode 62 therein, while the cathode compartment 60 has a cathode 64 therein, the anode and cathode being connected in a direct current circuit. Preferably the membranes 50 and 54 are anion selective permeable membranes, while 52 and 56 are cation selective permeable membranes. Thus these membranes possess selective ion permeability or permselectivity. With the passage of electric current between the electrodes 62 and 64 through the electrolyte and the membranes 50, 52, 54 and 56, the electrolyte in the cells 38 and 42 will become more dilute due to ionic migration while that in the cell 40 will become more concentrated due to ionic migration, and in addition changes in the composition of the electrolyte will occur in the anode and cathode compartments 58 and 60 as a result of electrolysis.

The anion selective permeable membranes 50 and 54 are readily permeable to anions but offer great resistance to the passage of cations. On the other hand, the cation membranes 52 and 56 are readily permeable to cations but offer great resistance to the passage of anions. Ion selective membranes are 3 dimensional membranes which have reactive chemical groups bound therein which make them permeable selective either to anions or cations, and should be substantially insoluble but at least slightly permeable with respect to the electrolyte used.

The interstices between such reactive chemical groups bound in the membranes are filled with water or other liquid and such reactive chemical groups, being more or less free to dissociate, are capable of exchanging any ions of the type to which the membrane is permselective and which may be in the liquid in the interstices. Random passages exist through the membranes which in the ideal case are of such width that ions can pass through only by displacing some of the ions of the reactive chemical groups lining the passages. Such displacement can occur only by an ion exchange mechanism. Since the chemical groups lining the passages of a permeable selective membrane can exchange only one type of ion, the membrane is readily permeable to such type of ion but offers great resistance to the passage of the other type of ions. An ideally permeable selective membrane would permit free passage of ions of one charge but would prevent completely the passage of ions of the opposite charge. However, the perm selectivity of membranes depends on a number of factors such as the type, concentration and temperature of the electrolyte used.

In order to achieve ionic migration the membranes must be electrically conductive. The mechanism of electrical conductivity in ion permselective membranes is similar to that of aqueous solutions of electrolytes; that is, it depends on the existance of mobile ions within the membranes. However, conductivity in the membranes differs from that in the solution in that in the membranes the current is carried chiefly by the ions of the type to which the membrane is selective. For ionic migration efficiency, the membranes should have high conductivity as well as high selectivity.

Considering, for example, as a working fluid an aqueous solution of lithium bromide (LiBr), the passage of electric current between the electrodes will cause the migration of bromide ions through the anion selective membranes 50 and 54 toward the anode and into the compartments 40 and 58 while the lithium ions will migrate through the cation selective membranes 56 and 52 into the compartments or cells 40 and 60. This will increase the concentration in the cell 40 while decreasing the concentration in the cells 42 and 38.

A single stage dialyzer would consist of an anode, an anionic membrane, a cationic membrane and a cathode. With the passage of electric current between the electrode, the solution between the two membranes would become more dilute and changes in the composition of the electrolyte will occur in the anode and cathode compartments as a result of electrolysis. A multiple stage electro-dialyzer consists of a series of pairs of anionic and cationic selective membranes between a single anode and a single cathode and in such dialyzer the solution becomes more dilute between alternating sets of anion and cation membranes and more concentrated between the intervening sets of membranes, thus effecting the desired separation into a more concentrated and a more dilute solution and counter-current flow will minimize concentration differences on the opposite sides of any given membrane, thus minimizing the effect of diffusion.

Figs. 2 and 3, which will be later described, disclose multiple stage electro-dialyzers while Fig. 1 discloses a single stage dialyzer in which the anode and cathode compartments are separated from the electrolyte which flows through the refrigerating system whereby changes in the electrolyte in the anode and cathode compartments do not affect the refrigerant and/or absorbent.

It is possible in the electro-dialyzer to employ only a single type of permselective membrane, either anionic or cationic with the other membrane or membranes being non-selective. A non-selective membrane is one which would permit ionic migrations both directions. The use of the single type permeable membrane is less efficient for the reason that such a membrane will have the same transference number as the electrolyte, whereas a permselective membrane approaches a transference number of unity for the type of ion to which the membrane is permeable selective.

It is of course necessary to employ permselective membranes which have the desired property in the concentration range of the electrolyte employed. The ion exchange capacity of a membrane or resin has a certain relationship to the swelling volume thereof. If we define the ion exchange capacity $(C)$ of a membrane as the equivalent of exchange capacity per liter of dry resin, and $(a)$ as the swelling volume represented by the liters of a solution absorbed per liter of dry resin, then the ratio of $(C)$ to $(a)$ should be 20 or greater for an aqueous solution of lithium bromide having a concentration of 20 moles per liter. If the ion exchange capacity of the resin is 3 gram equivalents per liter of dry resin and the swelling volume is 0.15, the ratio of $(C)$ to $(a)$ is 20. If the swelling volume $(a)$ increases, the electrical resistance of a given thickness of membrane in a given solution decreases. In those non-aqueous systems in which the molar concentration of electrolyte would be less than the figure cited, the ratio of exchange capacity to swelling volume could correspondingly assume a lower figure.

The reactions occurring in the electrode and anode compartments may be of several types and in each case it is desirable to employ measures to compensate or neutralize the effects of these reactions. For example, employing an aqueous solution of calcium perchlorate $(Ca(ClO_4)_2)$ as the working fluid, hydrogen and oxygen would be evolved in the electrode compartments and these could be catalytically combined to form water by bringing these gases together in the presence of a suitable catalyst maintained at proper temperature for catalytic reaction. In the arrangement as illustrated in Fig. 1, the separation of the liquid in the anode and cathode compartments from the liquid flowing through the system would prevent the accumulation of any electrode reaction products in the system and such products could be processed to re-convert them for re-use in the anode and cathode compartments.

If an aqueous solution of lithium bromide is employed, bromine would be generated in the anode compartment. This bromine solution could be circulated by the circulation system shown in Fig. 1 to the cathode compartment where it would be reduced back to a bromide ion thus neutralizing the effect obtained at the anode. To prevent the formation of hydrogen at the cathode, at the beginning of the operation, it is necessary to introduce a small concentration of bromine into the cathode compartment. If an aqueous solution of lithium chloride is employed as the electrolyte, chlorine would be generated at the anode and this could be circulated back to the cathode compartment where it would be converted back to a chloride ion. To effect the circulation of electrolyte between the anode and cathode compartments 58 and 60, the conduits 72 and 74 may be employed with a circulation pump 76 arranged in one of such conduits.

It would also be possible to employ for the same purpose an oxidation-reduction system. For example, if both ferric and ferrous iron are present in the solution, in the compartments 58 and 60, ferric iron would be reduced to ferrous iron at the cathode and ferrous iron would be oxidized to ferric iron at the anode, and with a rapid circulation between the anode and cathode compartments there would be no net chemical change in the electrolyte.

Other suitable examples of electrolyte that might be employed are lithium bromide in methanol or ethanol, tetraethylammonium bromide in methanol, or non-volatile acids such as sulphuric acid with a suitable ionizing solvent such as water.

In the modification of the dialyzer illustrated in Fig. 2, the refrigerant and absorbent mixture from the absorber is divided into two streams and supplied to the dialyzer through the conduits 100 and 102. In this arrangement the streams are passed in counter-flow relation so as to minimize the concentration differential across any given membrane. Thus the mixture introduced into the dialyzer through the conduit 100 will flow through the cells 104, 106, 108, 110 and 112 in series while the mixture supplied through the conduit 102 will flow in series through the cells 114, 116, 118 and 120 to form a concentrated solution which is conducted by the conduit 30 to the absorber, whereas the solution discharged from the cell 112 will be a dilute solution which will be conducted by the conduit 44 to the evaporator.

The membranes 124, 126, 128, 130 and 132 will be anionic membranes while the other membranes will be cationic, although, as previously indicated, only one type need be permselective. Since the concentration of one of the streams will become more dilute and the concentration of the other stream will become more concentrated in its flow through the dialyzer, the membranes employed will desirably vary in characteristics is accordance with the molar concentration range in which it operates.

The anode and cathode compartments 140 and 142 are provided with anodes and cathodes and the electrolyte therein as in Fig. 1 is separated from the electrolyte which flows through the refrigerating system and the provisions described in connection with Fig. 1 for eliminating or neutralizing the electrode reaction products would also be employed in the modification illustrated in Fig. 2.

Fig. 3 illustrates one-half of a multiple stage counterflow dialyzer. Since electrode reaction should preferably be kept at a minimum, it seems desirable that the layers immediately adjacent to each electrode should transmit the most dilute electrolyte. This can be accomplished by feeding the mixture from the absorber to the dialyzer at a midpoint between the electrodes and by using two parallel circuits only one of which is shown in Fig. 3, since the system is symmetrical.

A mixture of absorbent and refrigerant, for example 7 volumes having a normality of 18 is divided into two streams and each stream is then further subdivided into 7 parts. The conduit 200 represents one of such streams and the conduits 202, 204, 206, 208, 210, 212 and 214 represent the seven subdivisions thereof. The electrodialyzer is divided into a series of cells which are connected in circuit flow relationship as indicated and separated by permselective membranes with the anion membranes alternating with the cation membranes. Thus beginning with the membrane at the bottom of Fig. 3, such membrane may be an anion membrane 220, the membrane immediately thereabove may be a cation membrane 222, and so on. An anode would be disposed below and immediately adjacent the lowermost anion membrane while the cathode would be on the far side of the last cation membrane of the other half of the dialyzer unit with all of the membranes arranged in a line between the electrodes.

The space between each two adjacent membranes 220 and 222 constitutes a cell through which the electrolyte flows in the direction indicated by the arrows. The numbers shown in the flow chart indicate relative concentrations of the electrolyte. The streams flowing through conduits 204, 206, 208, 210, 212 and 214 in the first stage would undergo a concentration change from 6 to 7 while the stream flowing counter-currently would undergo a dilution in the concentration from 6 to 5. Where 7 volumes of electrolyte entering the dialyzer have a normality of 18, and it is desired to increase the concentration to a normality of 21 and to return 6 volumes thereof to the absorber, the concentration in the first stage would be increased by 3 moles. It will be observed that the stream flowing through the conduit 202 flows all the way through the dialyzer unit and that one volume of electrolyte is discharged from the dialyzer having a normality of zero. By counter-flow the concentration of the stream is reduced in a series of steps or stages in its flow through the dialyzer from a normality of 18 to a normality of zero. However, in order to decrease the electrical resistance through the dialyzer, it would be preferable to stop short of complete deionization of the electrolyte and to take off the dilute solution from the dialyzer at a normality above zero, which could be done by discontinuing the dialysis at a point where the stream 202 reaches the desired normality.

The liquid of the stream 202 constitutes the refrigerant which is supplied to the evaporator while the streams 204 to 212, inclusive, are manifolded into a conduit 230 which supplies the concentrated electrolyte therein to the absorber. The lines 232, 234, 236, 238 and 240 designate the divisions between the various stages of the dialyzer. While the dialyzer partly shown in Fig. 3 is a 2-pass, 6-stage dialyzer, the number of stages employed may vary depending upon a number of factors, including the types of electrolyte and membranes employed, the relative proportions of absorbent and refrigerant desired and the change in concentration necessary to obtain the same.

From the foregoing, it will be evident that the 7 volumes of electrolyte which enter the dialyzer through the conduit 200 at a relative concentration of 6 will be converted to 6 volumes at a relative concentration of 7 and one volume at a zero concentration.

The dialyzer illustrated in Fig. 3 may be desired use only a single type of ion selective membrane as previously discussed and in addition should include, if necessary, provisions as hereinbefore described for neutralizing or counteracting the products of the electrode reactions.

While I have illustrated and described preferred embodiments of my invention, it is understood that these are

I claim:

1. A refrigerating system including an evaporator, an absorber, an electrodialyzer and a working fluid comprising an electrolyte solution wherein said electrodialyzer separates said working fluid as discharged from said absorber into a liquid refrigerant and an absorbent, means for conducting said refrigerant to said evaporator and said absorbent to said absorber, said absorber being in communication with said evaporator so that refrigerant vapor evolved therein may be conducted to said absorber for absorption into said absorbent.

2. A system according to claim 1 including provisions for returning liquid residue from said evaporator directly to said dialyzer.

3. A system according to claim 1 including provisions for separating said working fluid as discharged from said absorber into a plurality of streams and feeding such streams in counterflow relation through said electrodialyzer.

4. A refrigerating system including an evaporator, an absorber, an electro-dialyzer and a working fluid comprising an electrolyte solution wherein said dialyzer separates said working fluid as discharged from said absorber into a liquid refrigerant and an absorbent, means for conducting said refrigerant to said evaporator and said absorbent to said absorber, said absorber being in communication with said evaporator so that refrigerant vapor evolved therein may be conducted to said absorber for condensing therein by absorption into said absorbent, and provisions for separating the products of reactions at the electrodes from said refrigerant and absorbent and for counteracting said products of reaction.

5. A refrigerating system including an evaporator, an absorber, an electro-dialyzer and a working fluid comprising an electrolyte solution wherein said dialyzer separates said working fluid as discharged from said absorber into a liquid refrigerant and an absorbent, means for conducting said refrigerant to said evaporator and said absorbent to said absorber, said absorber being in communciation with said evaporator so that refrigerant vapor evolved therein may be conducted to said absorber for condensing therein by absorption into said absorbent, said dialyzer comprising a series of stages in which electrolyte is conducted in counter-flow relation in each stage.

6. A system according to claim 5 wherein the concentration differential of the electrolyte in counter-flow relation in each stage is substantially uniform.

7. The process of refrigeration which includes the steps of employing an electrolyte solution as an absorbent to absorb refrigerant vapor, electrodialyzing the resulting mixture to separate liquid refrigerant from the absorbent, evaporating said liquid refrigerant to produce refrigeration, and conducting the vapor therefrom into contact with absorbent resulting from such dialysis.

8. The process of refrigeration which includes the steps of employing an electrolyte as an absorbent to absorb refrigerant vapor, electrodialyzing the resulting liquid mixture into concentrated and dilute solutions, evolving vapor from said dilute solution to produce refrigeration, and conducting such vapor into contact with said concentrated solution for absorption thereby.

9. A method according to claim 8 wherein said electrodialysis is effected in a series of stages in which electrolyte is conducted in counter-flow relation in each stage.

10. A method according to claim 8 wherein said electrodialysis is effected in a series of stages in which electrolyte is conducted in counter-flow relation in each stage and wherein the concentration differential of the electrolyte in counter-flow relation in each of the stages is substantially uniform.

11. A method according to claim 8 wherein said electrodialysis is effected in a series of stages in which electrolyte is conducted in counter-flow relation in each stage and wherein the concentration differential of the electrolyte in counter-flow relation in each of the stages is substantially uniform and a minor fraction of the concentration differential between said concentrated and dilute solutions.

12. In an absorption refrigerating system wherein the refrigerant and the absorbent mixture constitute an electrolyte, that method of dissociating the refrigerant from the absorbent which includes the step of electrodialyzing such mixture into at least two liquid streams.

13. A method according to claim 12 which includes the step of dividing the refrigerant and absorbent mixture into at least two streams and passing such streams in counter-flow relation while subjecting the same to electrodialysis.

14. In an absorption refrigerating system wherein the refrigerant and the absorbent mixture constitute an electrolyte, that method of dissociating the refrigerant from the absorbent which includes the steps of electro-dialyzing such mixture to form a dilute solution and a concentrated solution to produce refrigeration, and utilizing said concentrated solution to absorb the vapor of said dilute solution.

References Cited in the file of this patent

UNITED STATES PATENTS

| | | |
|---|---|---|
| 1,717,584 | Ruben | June 18, 1929 |
| 2,044,750 | Bryant | June 16, 1936 |
| 2,310,354 | Deysher | Feb. 9, 1943 |
| 2,563,575 | Berry | Aug. 7, 1951 |
| 2,635,431 | Bichowsky | Apr. 21, 1953 |
| 2,636,851 | Juda | Apr. 28, 1953 |
| 2,636,852 | Juda | Apr. 28, 1953 |
| 2,638,760 | Mills | May 19, 1953 |
| 2,681,320 | Bodamer | June 5, 1954 |
| 2,694,580 | Katz | Nov. 16, 1954 |
| 2,708,658 | Rosenberg | May 17, 1955 |
| 2,721,171 | Arnold | Oct. 28, 1955 |
| 2,752,306 | Juda | June 26, 1956 |
| 2,767,135 | Juda | Oct. 16, 1956 |

FOREIGN PATENTS

| | | |
|---|---|---|
| 494,811 | Germany | Mar. 21, 1930 |
| 504,756 | Belgium | Aug. 14, 1951 |
| 694,223 | Great Britain | July 15, 1953 |

OTHER REFERENCES

Electrochemical Desalting of Sea Water, Jour. AWWA, September 1952, pages 845–848.

"Amberplir in Exchange Membranes," Robin and Haas Company (1852), pages 19, 22 and 23.